United States Patent [19]
Cespon
[11] 4,321,092
[45] Mar. 23, 1982

[54] PRESSURE-SENSITIVE DUPLICATING MATERIAL

[75] Inventor: Manuel Cespon, Vienna, Austria
[73] Assignee: Kores Holding Zug AG, Zug, Switzerland

[21] Appl. No.: 128,806
[22] Filed: Mar. 10, 1980

Related U.S. Application Data

[63] Continuation of Ser. No. 887,519, Mar. 17, 1978, abandoned, which is a continuation of Ser. No. 688,759, May 21, 1976, abandoned, and Ser. No. 485,434, Jul. 3, 1974, abandoned.

[30] Foreign Application Priority Data

Jul. 27, 1973 [AT] Austria ........ 6656/73
Jul. 27, 1973 [AT] Austria ........ 6657/73
Sep. 10, 1973 [AT] Austria ........ 7806/73

[51] Int. Cl.³ ........ C09D 11/00
[52] U.S. Cl. ........ 106/21; 106/31; 282/27.5; 427/145; 427/146; 427/150; 427/151; 524/487
[58] Field of Search ........ 106/14.5, 21, 22, 27, 106/30, 31; 101/468, 472, 473, 459, 469; 282/27.5; 260/42.21; 427/145, 146, 150, 151, 153

[56] References Cited

U.S. PATENT DOCUMENTS 3,843,384 10/1974 Adachi et al. ........ 106/21
3,856,554 12/1974 Jablonski et al. ........ 427/151
3,906,123 9/1975 Vincent et al. ........ 427/145

*Primary Examiner*—John Kight, III
*Assistant Examiner*—Amelia B. Yarbrough
*Attorney, Agent, or Firm*—Ernest F. Marmorek

[57] ABSTRACT

A pressure-sensitive copying material which employs a color-producing substance and a color substance-accepting material is disclosed. The color substance-accepting material contains, as reaction components, a chloride of a metal having an atomic weight of from 50–66, together with a urea or its derivatives and a binding agent. The color-producing substance includes a dyestuff which is combined with the binding agent and reacts with the color substance-accepting material during color formation.

10 Claims, No Drawings

PRESSURE-SENSITIVE DUPLICATING MATERIAL

This is a continuation, of application Ser. No. 887,519, filed Mar. 17, 1978 which in turn was a continuation of Ser. Nos. 688,759 and 485,434 filed May 21, 1976 and July 3, 1974 respectively and all abandoned.

BACKGROUND AND SUMMARY OF THE INVENTION

The present invention is concerned with pressure-sensitive carbon-copying materials, also known as chemical copying papers, such copying papers commonly being provided with a color-forming coating and a color substance-accepting coat. Under pressure, part of the color-former reacts with the color-substance acceptor under local discoloration.

Such copy papers contain, in most cases, organic compounds which are enclosed in micro-capsules, and which are commonly known as color-formers since, in combination with color-substance acceptors, they produce a color-reaction. Such color formers include, for example, crystal violet lactone, malachite green lactone, benzoyleucomethylene blue, rodamin beta lactume or leucoauramine. Color substance acceptors which are presently in use include, for example, those having a base of attapulgite, zeolite, kaolin, phenol resins, as well as phenol compounds with freely reacting phenol groups in combination with binding agents. Such binding agents may include, for example, polyvinyl, polyvinyl chloride and polyvinyl acetate compounds and mixed polymerizates of these compounds and resins, for example, ester-derivatives of colophony and alcohol, as well as metal stearates and silicic acid. Commonly, the color-formers and color-substance acceptors are present in separate layers. Such a paper may, however, also comprise a sheet which contains color-forming agents as well as color-substance acceptors, possibly with an intermediate layer. Under pressure, a part of the color-former reacts with the color-substance accepting-mass under local discoloration.

It has been found that the color-substance acceptor masses which are utilized in chemical copying papers can be improved in many respects by adding to these masses chlorides of metal salts, sometimes in combination with urea or urea-derivatives as the chief reacting components.

The utilization of metal chlorides will result in an intensive color formation which is characterized by a special light-stability, so that this color formation is obtained with color-forming coats which are not as thick as the acceptor-layers, in which are present predominantly the common color-substance acceptors, such as attapulgite or kaolin.

Accordingly, the present invention is concerned with a pressure-sensitive copying material based on a color-forming mass and a color-substance accepting mass which reacts when coming in contact with said color-forming mass to produce color, and characterized in that the color-substance accepting mass contains as reaction components a chloride of a metal having an atomic weight of from 50-66, the metal preferably being zinc, vanadium, chromium, manganese, iron, cobalt, nickel or copper, possibly in combination with urea or its derivatives, for example thiocarbamine. Also present are a binding agent and other additives. The metal salt is bound to the base material directly in combination with the binding agent, and the color-forming mass comprises an initial dyestuff product which is also combined directly with the binding agent, and which reacts with the color-substance acceptor during color-formation.

The color-substance accepting mass can be applied to the base with the aid of a solvent in which the metal chloride, or the combination metal-chloride and urea which is to be used, or a derivative thereof, is insoluble, or is applied also in the form of a fluid solution. In the latter case, the metal-chloride, or the combination to be utilized, may be dispersed in wax and applied at a temperature of from 50°-220° C. The waxes which may be utilized may be vegetable, animal- or mineral-waxes, synthetic and chlorinated waxes, as well as paraffins, oxide-waxes, polyethylene- and polyethylene-oxide waxes having a molecular weight of 400-12000.

In the application of the solvent, there may be used aliphatic hydrocarbons, chloro-hydrocarbons, aromatic hydrocarbons, alcohols, esters or ketones.

Additionally, suitable binding agents for the coating application are polyvinyl-, polyvinyl chloride- and polyvinyl acetate compounds, or a mixed polymerizate of these compounds to which may be added softening agents, metal stearates such as cobalt or zinc stearates, natural resins or additional synthetic resins, and conditionally active or inactive clay, for example kaolin or silicic acid. As urea derivatives, one may utilize thiocarbamine or any random derivative of the common formula:

$$C_pH_{4+q}R$$

in which

- $p=1$-$20$, $q=1$-$16$ and,
- R = a member of the group $N_2O$, $N_2O_2$, $N_2S$ or $N_4O_3$, or a complex compound with halogen, especially a trifluoride or trichloride urea complex compound.

Urea as well as thiocarbamine, and especially diphenylthiocarbamine should be mentioned as an additive for the metal chloride.

It has also been noted that the addition of a metal stearate or a mixture of acid and alcohol on an acetylene base with cycloaliphatic N- or O-containing condensation-products results in an intensification of the color reaction. As to the stearates utilized in the copying materials of the present invention, in addition to the cobalt and zinc stearates, there may also be utilized stearates of lead, tin, calcium, aluminum, barium or iron.

It is common in the prior art to also add metal salts to the color-substance accepting masses. However, these components should be added only in small quantities, in order to accelerate the color-format ion and not for the purpose of producing the actual color-reaction. In the present compositions, the metal salts, especially the zinc-chloride or the combination of zinc-chloride and urea or its derivatives, are added in an amount of about 5-90% in weight. The ratio of the mixture of metal chloride and urea or its derivatives should preferably be from about 5:1 to 1:1.

Zinc chloride is especially suitable as the metal chloride. However, excellent color-intensive and color-stable copies are also obtained with other chloride such as, for example, chromium (III) chloride, manganese (II) chloride, iron (III) chloride, nickel (II) chloride, cobalt (II) chloride or copper (II) chloride.

In the case where zinc chloride and urea are utilized for the color-substance accepting mass, a ratio of these substances of about 9:1 to 1:5 is advantageously employed.

The present invention produces not only the advantage of obtaining the above listed color-intensive and color-true transfer pictures, but it also produces the possibility for applying the color-substance accepting mass in a substantially thinner coating than has been formerly possible. The color-substance accepting mass may be applied in a quantity of from 2–5 g/m$^2$. It is, however, a special effect of the present invention that an application of only 0.5–6 g/m$^2$, preferably 0.3–4 g/m$^2$ suffices, without causing a reduction of the quality of the copies. Such thin layers of application result in the advantage that substantially more sheets may be used in a set of copying-papers than was formerly possible. The preferred thickness of application depends on the type of the coating method or on the type of the solution- or dispersing-material used. If water is utilized as the dispersing-agent, then the applied coats are somewhat thicker than in the use of organic solvents, such as acetone or ethyl alcohol.

DESCRIPTION OF THE PREFERRED EMBODIMENTS

In Table No. 1 hereinbelow are summarized comparison tests in accordance with the present inventive process. The color-former consisted of two parts crystal violet lactone and one part benzoyleucomethylene blue. The color-substance accepting mass contained:

1=attapulgite+binding agent
2=zinc chloride+binding agent
3=urea+binding agent
4=attapulgite+zinc chloride+binding agent
5=attapulgite+urea+binding agent
6=zinc chloride+urea+binding agent
7=zinc chloride+urea+metal stearate+binding agent
8=zinc chloride+urea+metal stearate+attapulgite+binding agent The coating thickness was 2 to 2.5 g/m$^2$, and acetone or water was used as an application medium.

TABLE NO. 1

| | Reaction Intensity | |
|---|---|---|
| Mass | Acetone | $H_2O$ |
| 1 | almost no reaction | very weak reaction |
| 2 | reaction color too light | good reaction |
| 3 | no reaction | no reaction |
| 4 | reaction as in 2 | reaction as in 2 |
| 5 | reaction as in 1 | reaction as in 1 |
| 6 | substantially stronger reaction as in 1 to 5 | very strong reaction, better than in 1 to 5 |
| 7 | reaction more intensive than in 6 | reaction more intensive than in 6 |
| 8 | no improvement in reaction over 7 | no improvement in reaction over 7 |

From the foregoing Table No. 1, it may be noted that with a color substance accepting mass which, according to the present invention, contains zinc chloride and urea as the reaction components, substantially better results were obtained than with masses which do not contain these reaction-components. These results can be improved somewhat when, in addition to the foregoing combination, masses are used which also contain metal stearate. The stearates utilized in the present inventive copying papers are, for example, lead-, zinc-, calcium-, aluminum-, barium-, and iron-stearate.

The examples listed below contain the color-substance acceptor masses and color-formers utilized in the present inventive copying material, whereby in the utilization of masses which are applied with the help of a solvent, the respective solvent is also mentioned.

| EXAMPLES FOR COLOR-SUBSTANCE ACCEPTOR-MASSES: | | |
|---|---|---|
| 1. | Oxocerite | 80 parts |
| | polyethylene wax | 20 parts |
| | mixture of an acid amide and an alcohol on acetylene base with cycloaliphatic N- and O-containing condensation products | 5 parts |
| | zinc chloride | 25 parts |
| | thickness of application - 2.8 g/m$^2$ | |
| 2. | carnuba wax | 60 parts |
| | micro wax | 15 parts |
| | polyethylene wax | 15 parts |
| | mixture of an acid amide and alcohol on acetylene base with cycloaliphatic N- and O-containing condensation products | 6 parts |
| | O-containing condensation products | 6 parts |
| | zinc chloride | 20 parts |
| | urea | 8 parts |
| | thickness of application - 3.5 g/m$^2$ | |
| 3. | carnauba wax | 80 parts |
| | paraffin | 30 parts |
| | colophonic resin | 6 parts |
| | polyethylene | 12 parts |
| | zinc chloride | 30 parts |
| | mixture of an acid amide and alcohol on acetylene base with cycloaliphatic N- and O-containing condensation products | 3 parts |
| | thickness of application - 3 g/m$^2$ | |
| 4. | zinc chloride | 15 parts |
| | polyterpene resin | 3 parts |
| | calcium carbonate | 10 parts |
| | zinc stearate | 3 parts |
| | polyethylene wax | 1 part |
| | thiocarbamine | 5 parts |
| | acrylic resin | 5 parts |
| | benzene | 90 parts |
| | thickness of application - 3.6 g/m$^2$ | |
| 5. | zinc chloride | 20 parts |
| | phthalic acid ester of technical hydroabietic alcohol | 5 parts |
| | titanium dioxide | 10 parts |
| | urea | 7 parts |
| | calcium stearate | 2 parts |
| | polyethylene wax | 5 parts |
| | polystyrene | 4 parts |
| | trichloroethylene | 80 parts |
| | thickness of application - 3.8 g/m$^2$ | |
| 6. | zinc chloride | 25 parts |
| | urea | 10 parts |
| | stockalite | 20 parts |
| | calcium stearate | 6 parts |
| | dibutylphthalate | 3 parts |
| | polyvinyl alcohol | 3 parts |
| | water | 85 parts |
| | thickness of application - 4 g/m$^2$ | |
| 7. | zinc chloride | 15 parts |
| | thiocarbamine | 5 parts |
| | zinc stearate | 5 parts |
| | acrylic butyral dispersion | 2 parts |
| | kaolin (China clay) | 20 parts |
| | $H_2O$ | 90 parts |
| | thickness of application - 1.9 g/m$^2$ | |
| 8. | zinc chloride | 9 parts |
| | attapulgite | 5 parts |
| | zinc stearate | 5 parts |
| | kaolin | 5 parts |
| | polyvinyl acetate | 6 parts |
| | maleic acid modified pentaerythrite colophonic ester | 3 parts |
| | acetone | 120 parts |
| | thickness of application - 1.7 g/m$^2$ | |
| 9. | zinc chloride | 12 parts |
| | attapulgite | 3 parts |
| | lead stearate | 5 parts |
| | calcium carbonate | 5 parts |
| | phthalic acid ester of technical hydroabietic alcohol | 6 parts |
| | vinylchloride acetate copolymer | 10 parts |
| | methylethyl ketone | 80 parts |

-continued

| EXAMPLES FOR COLOR-SUBSTANCE ACCEPTOR-MASSES: | | |
|---|---|---|
| | thickness of application - 2 $g/m^2$ | |
| 10. | zinc chloride | 8 parts |
| | attapulgite | 2 parts |
| | calcium stearate | 6 parts |
| | modified pentaerythrite ester | 8 parts |
| | polystyrene | 1 part |
| | vinyl acetate | 5 parts |
| | acetone | 90 parts |
| | trichloroethylene | 10 parts |
| | thickness of application - 1.4 $g/m^2$ | |
| 11. | zinc chloride | 15 parts |
| | attapulgite | 5 parts |
| | polyvinylbutyrol | 3 parts |
| | zinc stearate | 10 parts |
| | titanium dioxide | 10 parts |
| | glycerin ester of polymerized colophony | 5 parts |
| | ethyl alcohol | 100 parts |
| | thickness of application - 0.9 $g/m^2$ | |
| 12. | zinc chloride | 20 parts |
| | attapulgite | 5 parts |
| | calcium stearate | 5 parts |
| | kaolin | 10 parts |
| | polyvinyl alcohol | 5 parts |
| | water | 150 parts |
| | thickness of application - 3.5 $g/m^2$ | |
| 13. | zinc chloride | 12 parts |
| | urea | 4 parts |
| | vinyl acetate | 1 part |
| | phthalic acid ester of technical hydroabietic alcohol | 2 parts |
| | acetone | 80 parts |
| | thickness of application - 2 $g/m^2$ | |
| 14. | Iron (III)-chloride | 15 parts |
| | urea | 4 parts |
| | vinyl acetate | 1 part |
| | phthalic acid ester of technical hydroabietic alcohol | 2 parts |
| | acetone | 80 parts |
| | thickness of application - 2.2 $g/m^2$ | |

In place of iron (III)-chloride, there may be employed chromium (III)-chloride, vanadium (III)-chloride or manganese (III)-chloride.

| | | |
|---|---|---|
| 15. | zinc chloride | 16 parts |
| | diphenyl thiocarbamine | 6 parts |
| | polyvinyl alcohol | 1.5 parts |
| | calcium stearate | 5 parts |
| | $H_2O$ | 90 parts |
| | thickness of application - 4.3 $g/m^2$ | |
| 16. | nickel (II)- or cobalt (II)-chloride | 18 parts |
| | diphenyl thiocarbamine | 6 parts |
| | polyvinyl alcohol | 1.5 parts |
| | calcium stearate | 5 parts |
| | $H_2O$ | 90 parts |
| | thickness of application - 4.4 $g/m^2$ | |
| 17. | zinc chloride | 15 parts |
| | urea | 10 parts |
| | polyvinyl butyral | 3 parts |
| | modified pentaerythrite ester | 2 parts |
| | calcium carbonate | 10 parts |
| | zinc stearate | 4 parts |
| | ethyl alcohol | 120 parts |
| | thickness of application - 0.9 $g/m^2$ | |
| 18. | zinc chloride | 20 parts |
| | N-phenylthiocarbamine | 10 parts |
| | starch | 3 parts |
| | titanium dioxide | 8 parts |
| | $H_2O$ | 130 parts |

thickness of application—5.3 $g/m^2$

In place of zinc chlorids, copper (II)-chloride may be used in this example.

| EXAMPLES FOR COLOR-PRODUCING MASS | | |
|---|---|---|
| (A) | urea | 2 parts |
| | crystal violet lactone | 5 parts |
| | benzoyl-leukomethyl blue | 2 parts |
| | titanium dioxide | 25 parts |
| | polyvinyl alcohol | 4 parts |
| | water | 140 parts |

With an application of 2.8 $g/m^2$, there is obtained a blue color.

| | | |
|---|---|---|
| (B) | urea | 4 parts |
| | 3,3-indoylrothphthalide | 2 parts |
| | crystal violet lactone | 6 parts |
| | calcium carbonate | 20 parts |
| | vinyl acetate | 6 parts |
| | acetone | 105 parts |

With an application of 2.1 $g/m^2$, there is obtained a violet script.

| | | |
|---|---|---|
| (C) | thiocarbamine | 3 parts |
| | malachite green lactone | 10 parts |
| | kaolin | 15 parts |
| | polystyrene | 4 parts |
| | trichloroethylene | 80 parts |

With an application of 2.5 $g/m^2$, there is obtained a green script.

| | | |
|---|---|---|
| (D) | 3-diethylamino-6-methyl-7-anilino-fluoride | 10 parts |
| | calcium carbonate | 30 parts |
| | synthetic resin on a basis of styrene and maleic acid ester | 6 parts |
| | ethyl alcohol | 90 parts |

With a coating of 2 $g/m^2$, there is obtained a black coloring.

It is claimed:

1. A pressure-sensitive transfer material comprising in combination:

a color-accepting composition comprising as the essential color acceptor, a chloride of a metal having an atomic weight of 50 to 66, and a urea compound selected from the group consisting of urea, thiourea and diphenylthiourea, the weight ratio of said metal chloride to said urea compound being from about 5:1 to 1:1, mixed with and bound directly to a first binder;

a color-forming composition comprising as the essential color-former an initial metal chloride-developable dye precursor combined with and embedded directly in a second binder, said dye precursor being capable of undergoing a color change and forming a dye upon reaction with said metal chloride color acceptor, said metal chloride and said urea compound being present in said color-accepting composition in an amount effective to activate and react with said initial metal chloride-developable dye precursor to produce a color change upon pressure contact therewith, both compositions being mixed directly with said respective binders and present therein each in a substantially dry solid state; and carrier means operable for supporting at least one layer of said color acceptor and color-forming compositions.

2. The transfer material as claimed in claim 1, wherein said color-acceptor composition further comprises a stearate of a metal selected from the group consisting of cobalt, zinc, lead, tin, calcium, aluminum, barium, and iron and said first binder being a wax selected from the group consisting of vegetable, animal, synthetic and chlorinated waxes.

3. The transfer material as claimed in claim 1, wherein said first binder is selected from the group consisting of polyethylene wax having a molecular weight of from 400 to 12000, polyvinyl, polyvinyl chloride, polyvinyl acetate compounds, and mixtures thereof, and a softening agent.

4. The transfer material is claimed in claim 3, wherein said color-accepting composition further comprises an activated or inactive clay.

5. The transfer material as claimed in claim 1, wherein said metal chloride is selected from the group consisting of zinc (II)-chloride, chromium (III)-chloride, manganese (II)-chloride, iron (III)-chloride, nickel (II)-chloride, cobalt (II)-chloride, copper (II)-chloride, and vanadium (III)-chloride.

6. The transfer material as claimed in claim 1, wherein said color-accepting composition additionally comprises a mixture of an acid amide with an acetylene based alcohol and a cycloaliphatic N-and O-containing condensation product.

7. A pressure-sensitive recording system, comprising in combination:

a first carrier having a first surface;

a layer of a color-acceptor composition disposed on at least a portion of said first surface, said color-acceptor composition comprising as the essential color acceptor component in said composition, a chloride of a metal having an atomic weight of between 50 and 66, and a urea compound selected from the group consisting of urea, thiourea and diphenylthiourea, the weight ratio of metal chloride to said urea compound being from about 5:1 to 1:1, mixed in the dry state, in a first binder;

a second carrier having a second surface;

a layer containing a color-forming composition disposed on at least a portion of said second surface and juxtaposed to said first surface, said color-forming composition comprising a metal chloride-developable dye precursor embedded in a substantially dry state in a second binder and being capable of undergoing color change and forming a dye upon reaction with said metal chloride color-acceptor composition, said color-acceptor composition being present in an amount effective to react with and thus activate said dye precursor to produce a color change and form a dye upon pressure contact therewith while both compositions are in a substantially dry solid state and are substantially free of solvent.

8. The recording system as claimed in claim 7, wherein said color-acceptor composition further comprises a stearate of a metal selected from the group consisting of cobalt, zinc, lead, tin, calcium, aluminum, barium, and iron, and said second binder is selected from the group consisting of vegetable, animal, and synthetic and chlorinated waxes.

9. The recording system as claimed in claim 7, wherein said first binder is selected from the group consisting of polyethylene wax having a molecular weight of from 400 to 12000, polyvinyl, polyvinyl chloride, polyvinyl acetate compounds or mixtures thereof, and a softening agent.

10. The recording system as claimed in claim 7, wherein said metal chloride is selected from the group consisting of zinc(II)-chloride, chromium (III)-chloride, manganese (II)chloride, iron (III)-chloride, nickel (II)-chloride, cobalt(II)-chloride and copper(II)-chloride, vanadium(III)-chloride.

* * * * *